US010399492B1

(12) United States Patent
Paraskevas et al.

(10) Patent No.: US 10,399,492 B1
(45) Date of Patent: Sep. 3, 2019

(54) AUTOMATIC RECONFIGURATION AND CALIBRATION OF HAPTIC SEATS

(71) Applicant: GM Global Technology Operations LLC, Detroit, MI (US)

(72) Inventors: Evripidis Paraskevas, Royal Oak, MI (US); Brent N. Bacchus, Sterling Heights, MI (US); Yuchen Zhou, Troy, MI (US); Shifang Li, Shelby Township, MI (US); Prakash Mohan Peranandam, Troy, MI (US); Lawrence A. Bush, Shelby Township, MI (US); Donald K. Grimm, Utica, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/969,177

(22) Filed: May 2, 2018

(51) Int. Cl.
*B60Q 1/00* (2006.01)
*B60Q 9/00* (2006.01)
*B60N 2/90* (2018.01)

(52) U.S. Cl.
CPC ............ *B60Q 9/00* (2013.01); *B60N 2/90* (2018.02); *B60N 2002/981* (2018.02)

(58) Field of Classification Search
CPC ....... B60Q 9/00; B60Q 2/90; B60N 2002/981
USPC ..................................................... 340/425.5
See application file for complete search history.

(56) References Cited

U.S. PATENT DOCUMENTS

| 9,978,226 | B1* | 5/2018 | Mankame | B60N 2/986 |
|---|---|---|---|---|
| 2003/0153846 | A1* | 8/2003 | Marple-Horvat | A61B 5/18 600/587 |
| 2012/0161950 | A1* | 6/2012 | Heron | G01D 7/007 340/407.2 |
| 2013/0342366 | A1* | 12/2013 | Kiefer | G08B 6/00 340/901 |
| 2014/0028542 | A1* | 1/2014 | Lovitt | G06F 3/017 345/156 |
| 2014/0282051 | A1* | 9/2014 | Cruz-Hernandez | G06F 3/0414 715/744 |
| 2014/0319895 | A1* | 10/2014 | Lange-Mao | B60N 2/002 297/463.1 |
| 2016/0378186 | A1* | 12/2016 | Kim | G06F 3/016 345/156 |
| 2018/0012118 | A1* | 1/2018 | Catten | G06N 3/006 |
| 2018/0215395 | A1* | 8/2018 | Keany | G06K 9/6267 |
| 2018/0293401 | A1* | 10/2018 | Weimerskirch | G06K 9/00892 |
| 2018/0297613 | A1* | 10/2018 | Moia | B60W 50/16 |

* cited by examiner

*Primary Examiner* — Zhen Y Wu
(74) *Attorney, Agent, or Firm* — Cantor Colburn LLP

(57) ABSTRACT

Technical solutions are described herein for adjusting a notification system of a vehicle. An example method includes receiving, by a controller, an occupant profile of an occupant of the vehicle. The method further includes adjusting, by the controller, a haptic array according to the occupant profile, the haptic array comprising a plurality of haptic actuators, the adjusting comprising activating a first subset of the haptic actuators and deactivating a second subset of the haptic actuators. Further, the method includes providing, by the haptic array, a notification to the occupant of the vehicle by providing a haptic feedback using the activated haptic actuators.

20 Claims, 7 Drawing Sheets

AUTOMATIC RECONFIGURATION AND CALIBRATION OF HAPTIC SEATS

INTRODUCTION

The present disclosure relates to haptic devices, and more particularly to haptic seats in a vehicle to provide an alert to an occupant, and further to automatic reconfiguration and calibration of haptic seats.

It is desirable to provide alerts to an occupant, such as a driver of the vehicle to warn the driver of one or more events that can be automatically detected by one or more sensors or other systems of the vehicle to avoid collision and improve safety of the vehicle. Along with audio and visual alerts, it is desirable to provide alerts using a haptic device. Other desirable features and characteristics will become apparent from the subsequent detailed description and the appended claims, taken in conjunction with the accompanying drawings and the foregoing technical field and background.

SUMMARY

Technical solutions are described herein for adjusting a notification system of a vehicle. According to one or more embodiments, an example method includes receiving, by a controller, an occupant profile of an occupant of the vehicle. The method further includes adjusting, by the controller, a haptic array according to the occupant profile, the haptic array comprising a plurality of haptic actuators, the adjusting comprising activating a first subset of the haptic actuators and deactivating a second subset of the haptic actuators. Further, the method includes providing, by the haptic array, a notification to the occupant of the vehicle by providing a haptic feedback using the activated haptic actuators.

The occupant profile includes an occupant footprint of the occupant on a seat assembly. The occupant profile also includes a weight of the occupant. Adjusting the haptic array further includes calibrating, by the controller, an intensity of the haptic feedback provided by one of the activated haptic actuators according to the occupant profile. Adjusting the haptic array further includes grouping, by the controller, the haptic actuators into directional subgroups to provide the occupant with spatial awareness for the notification.

Further, automatically generating the occupant profile using one or more sensors, the generating includes determining a weight of the occupant, and determining an occupant footprint of the occupant. The method further includes determining, by the controller, if one of the activated haptic actuators is not in contact with the occupant, in response, providing an alert to the occupant to change seating position. The haptic actuators are embedded in a seat assembly.

According to one or more embodiments, a system for providing a notification to an occupant of a vehicle includes a haptic alert device comprising an array of haptic actuators. The system further includes a controller coupled with the haptic alert device, the controller configured to customize the array of haptic actuators. The customization further includes receiving, by a controller, an occupant profile. The customization further includes adjusting, by the controller, a haptic array according to the occupant profile, the haptic array comprising a plurality of haptic actuators, the adjusting comprising activating a first subset of the haptic actuators and deactivating a second subset of the haptic actuators. The customization includes providing, by the haptic array, a notification to the occupant of the vehicle by providing a haptic feedback using the activated haptic actuators.

The occupant profile includes an occupant footprint of the occupant on a seat assembly. The occupant profile also includes a weight of the occupant. Adjusting the haptic array further includes calibrating, by the controller, an intensity of the haptic feedback provided by one of the activated haptic actuators according to the occupant profile. Adjusting the haptic array further includes grouping, by the controller, the haptic actuators into directional subgroups to provide the occupant with spatial awareness for the notification.

Further, automatically generating the occupant profile using one or more sensors, the generating includes determining a weight of the occupant, and determining an occupant footprint of the occupant. The method further includes determining, by the controller, if one of the activated haptic actuators is not in contact with the occupant, in response, providing an alert to the occupant to change seating position. The haptic actuators are embedded in a seat assembly.

According to one or more embodiments a seat assembly includes a haptic array comprising a plurality of haptic actuators. The seat assembly further includes a controller coupled with the haptic array, the controller configured to customize the haptic array. The customization includes receiving, by a controller, a user profile. The customization further includes adjusting, by the controller, the haptic array according to the user profile, the adjusting comprising activating a first subset of haptic actuators and deactivating a second subset of haptic actuators. The customization further includes providing, by the haptic array, a notification to a user of the seat assembly by providing a haptic feedback using the first subset of haptic actuators.

The user profile includes a footprint of the user on a seat assembly. The user profile also includes a weight of the user. Adjusting the haptic array further includes calibrating, by the controller, an intensity of the haptic feedback provided by one of the activated haptic actuators according to the user profile. Adjusting the haptic array further includes grouping, by the controller, the haptic actuators into directional subgroups to provide the occupant with spatial awareness for the notification.

Further, automatically generating the user profile using one or more sensors, the generating includes determining a weight of the user, and determining an occupant footprint of the user. The method further includes determining, by the controller, if one of the activated haptic actuators is not in contact with the user, in response, providing an alert to the user to change seating position. The haptic actuators are embedded in a seat assembly.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
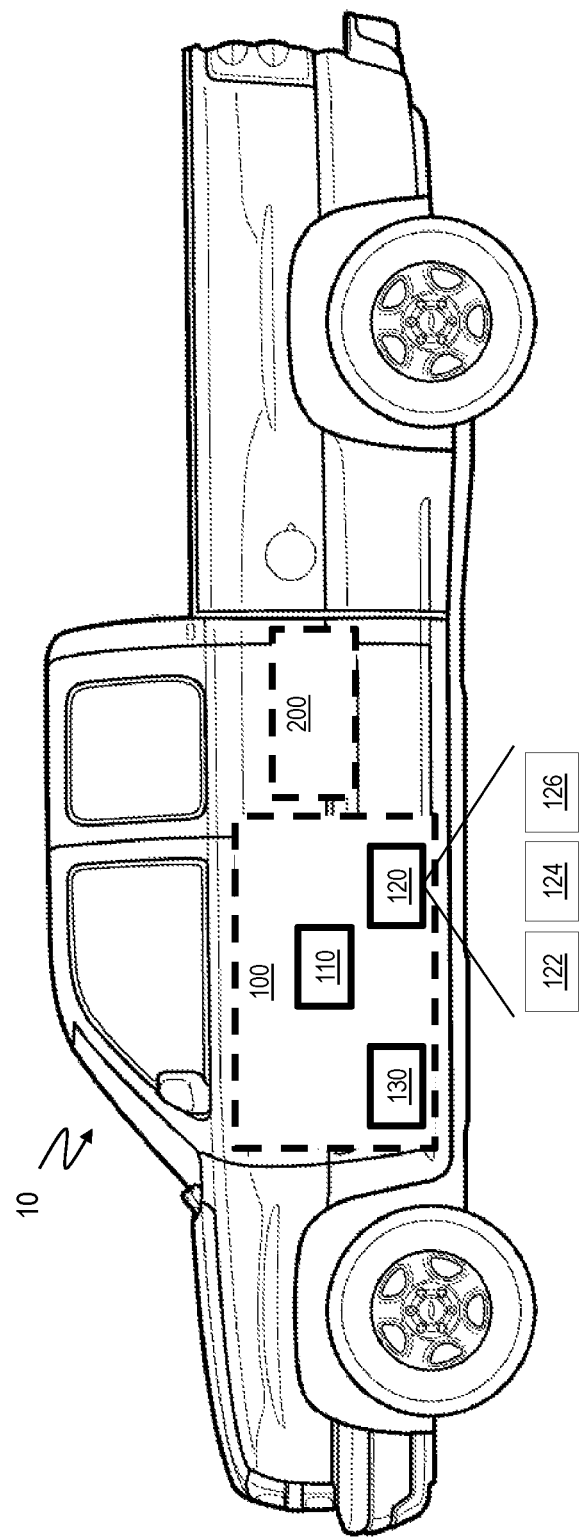
FIG. 1 depicts a block diagram of a vehicle that includes a driver alert system 100 in accordance with exemplary embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory module that executes one or more software or firmware programs, a combinational logic circuit, and/or other suitable components that provide the described functionality.

FIG. 1 depicts a block diagram of a vehicle 10 that includes a driver alert system 100 in accordance with exemplary embodiments. The driver alert system 100 includes, among other components, a collision avoidance module (and/or associated sub-systems) 110, a haptic alert device (or haptic feedback device) 120, and a control module 130. In one or more examples, the driver alert system 100 can further include a communications module, a perception module, and one or more additional alert devices, such as a visual alert device, an auditory alert device, and an infotainment alert device. In one or more examples, the haptic alert device 120 may be incorporated into a vehicle seat assembly 200.

During operation and as also discussed in greater detail herein, the control module 130 receives input signals from the collision avoidance module 110. The control module 130 evaluates the input signals and, as appropriate, operates the haptic alert device 120 and/or other alert devices to alert the driver based on the condition indicated by the received input signals. For example, the driver alert system 100 may function to alert the driver of a collision condition such that avoidance maneuvers (e.g., braking and/or steering) and/or automatic crash mitigation responses (e.g., braking and/or steering) may be initiated. Alternatively, or in addition, the driver alert system 100 alerts the driver of a remote vehicle based on one or more safety characteristics of the remote vehicle being monitored. Alternatively, or in addition, the driver alert system 100 provides the driver with spatial awareness regarding one or more objects in the vicinity of the vehicle 10. Although the figures shown herein depict example arrangements of elements, additional intervening elements, devices, features, or components may be present in an actual embodiment.

The collision avoidance module 110 can include one or more on-board vehicle sensors (e.g., camera, radar, ultrasonic, and/or lidar) that detect a potential for a collision based on the vehicle sensor signals. The collision avoidance module 110 may generally be implemented as, for example, forward collision warning, lane departure warning systems, lane keeping assist systems, front park assist systems, rear park assist systems, front and rear automatic braking systems, rear cross traffic alert systems, adaptive cruise control (ACC) systems, side blind spot detection systems, lane change alert systems, driver attention systems, front pedestrian detection systems, and rear pedestrian detection systems. As noted herein, the driver alert system 100 may further include a communications module to enable communications between vehicles and/or between the vehicle (V2V) and an infrastructure to forecast a potential collision due to traffic or activity either inside the line-of-sight of the driver or outside of the line-of-sight of the driver (e.g., a road hazard or traffic jam ahead is detected beyond the driver's line-of-sight). In one or more examples, the collision avoidance module 110 and/or communications module are communicatively coupled to the control module 130 that evaluates a potential for a collision based on the vehicle sensor signals and/or communications.

The haptic alert device 120 includes one or more sub-modules or units 122, 124, and 126, which cooperate to calibrate and generate an alert for the driver. The haptic alert device 120 may include a monitoring unit 122, a user customization unit 124, and an identification unit 126. As can be appreciated, the units shown in FIG. 1 may be combined and/or further partitioned to similarly coordinate and provide driver alerts.

The monitoring unit 122 monitors one or more components of the vehicle 10 to determine if a component is malfunctioning, the monitoring unit 122 may generate a warning message, a warning signal, and/or a faulty condition status that may be communicated to the vehicle driver or technician.

The user customization unit 124 manages the display of a configuration menu and manages user input received from a user interacting with the configuration menu. Such a configuration menu may be displayed on a display device within the vehicle 10 (for example, on an infotainment system display) or a display device remote from the vehicle 10. In various embodiments, the configuration menu includes selectable options that, when selected, allow a user to configure the various alert settings associated with the haptic alert device 120, and/or the other alert devices. The alert settings for the haptic alert assembly 120 can include, but are not limited to, an occurrence of the vibration (e.g., whether or not to perform the vibration for a particular mode), a location/area of the vibration on the seat, an intensity of the vibration, a duration of the vibration, and/or a frequency of the pulses of the vibration. Based on the user input received from the user interacting with the configuration menu, the user customization unit 124 stores the user configured alert settings in an alert settings database. As can be appreciated, the alert settings database may include volatile memory that temporarily stores the settings, non-volatile memory that stores the settings across key cycles, or a combination of volatile and non-volatile memory.

In one or more examples, the user configured alert settings are stored specific to different users, for example, by associating the user configured alert settings with a user identifier. The identification unit 126 automatically identifies the driver based on the user identification and sends a control signal to the user customization unit 124 to adjust the user settings of the haptic alert device 120 accordingly. The user identifier can be user login information, such as a username/password combination, biometric information of the user (fingerprint, iris, face etc.), or an electronic device carried by the user (key fob, RFID card etc.). The user customization unit 124 identifies the user that is the 'driver' of the vehicle 10 based on the user identification and adjusts the settings of the haptic alert device 120 using the user configured alert settings of the identified user.

Alternatively, or in addition, if the identification unit 126 cannot identify the driver, for example in case of a new user, or if the driver does not have settings that are stored, the identification unit 126 estimates the user's weight and footprint automatically using one or more haptic actuators of the haptic alert device 120. The identification unit 126, based on the estimated weight and footprint automatically generates user settings that are sent to the user customization unit 124 for adjusting the settings accordingly. In addition, the identification unit 126 offers to store the configuration for future use.

Further, the identification unit 126 adapts a subset of active actuators over time for each driver for dynamic reconfiguration. For example, the user settings associated with a first user are updated by the identification unit 126 automatically and dynamically during operation of the vehicle 10. The automatic recalibration may be performed based on the user's posture, the user's movement, feedback from the haptic actuators in the seat assembly 200, and the like.

Figure 2:
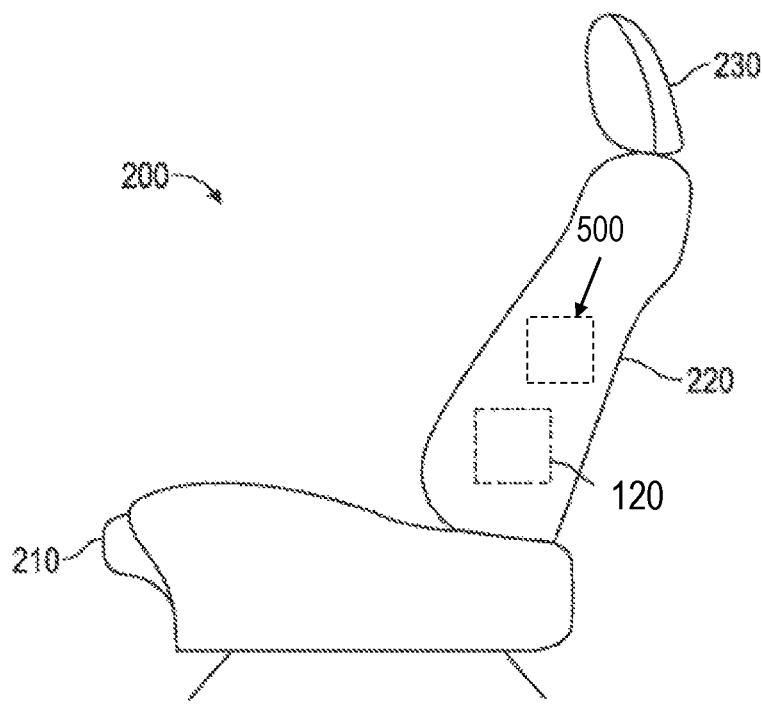
FIG. 2 depicts a schematic side view of a vehicle seat assembly in accordance with an exemplary embodiment.

FIG. 2 depicts a schematic side view of a vehicle seat assembly 200 in accordance with an exemplary embodiment. The seat assembly 200 may be installed on a floor of the passenger area of the vehicle 10. The seat assembly 200 is a driver seat for an automobile, although in other exemplary embodiments, the seat assembly 200 may be a passenger seat and/or implemented into any type of vehicle. Although an exemplary seat assembly 200 is described below, the driver alert system 100 may be implemented in any suitable type of seat assembly, including free standing seats, bench seats, massage seats, and the like.

The seat assembly 200 includes a lower seat member 210, a seat back member 220, a head rest 230, and the haptic alert device 120. The lower seat member 210 defines a generally horizontal surface for supporting an occupant (not shown). The seat back member 220 may be pivotally coupled to the lower seat member 210 and defines a generally vertical surface for supporting the back of an occupant. The head rest 230 is operatively coupled to the seat back member 220 to support the head of an occupant. The haptic alert device 120 is shown to be integrated with the illustrated seat assembly 200.

Figure 3:
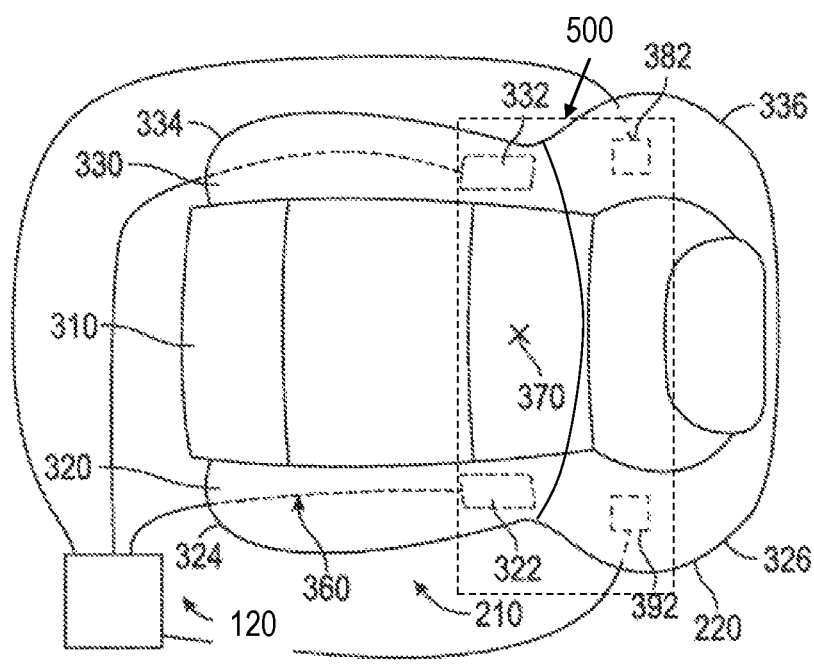
FIG. 3 is a top view of the seat assembly in accordance with an exemplary embodiment.

FIG. 3 is a top view of the seat assembly 200 in accordance with an exemplary embodiment. As shown in FIG. 3, the lower seat member 210 generally includes a seat pan 310, a first lower bolster 320, and a second lower bolster 330. The lower bolsters 320, 330 are generally considered the left outermost and right outermost side of the lower seat member 210, respectively. As can be appreciated, in various other embodiments, the seat pan 310 can be without lower bolsters 320, 330, such as a flat seat. In FIG. 3, the lower bolsters 320, 330 are arranged on the longitudinal sides of the seat pan 310 (e.g., the left and right sides) to support the legs and thighs of the occupants. Each of the lower bolsters 320, 330 may be considered to have a front end 324, 334 and a back end 326, 336 relative to the primary direction of travel. As shown, the seat back member 220 may overlap a portion of the lower bolsters 320, 330 at the back ends 326, 336. As is generally recognized in seat design, the lower bolsters 320, 330 are arranged on the sides of the lower seat member 210, typically at an angle to the seat pan 310. The haptic alert device 120 is integrated with the seat assembly 200 be being connected with an array of actuators 500, that includes haptic actuators 322, 332, 362, and 392.

Figure 4:
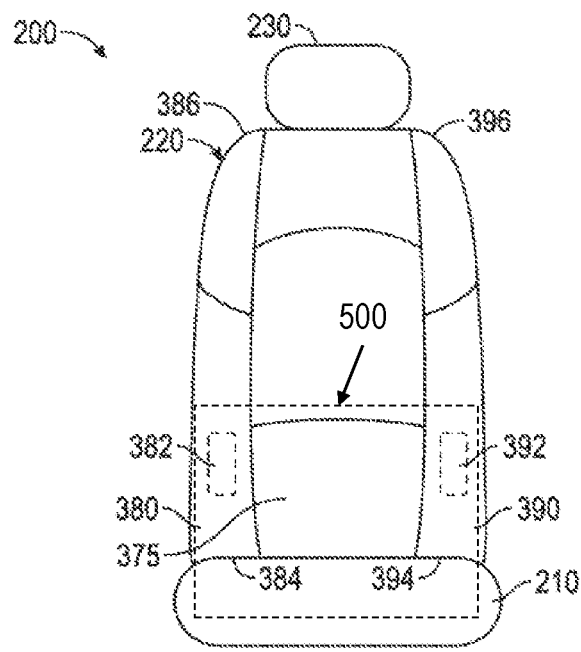
FIG. 4 depicts a front view of the seat assembly in accordance with an exemplary embodiment.

FIG. 4 depicts a front view of the seat assembly 200 in accordance with an exemplary embodiment. The seat back member 220 includes a main seat back portion 375, a first back bolster 380, and a second back bolster 390, although other arrangements may be possible. The back bolsters 380, 390 are arranged on the longitudinal sides of the main seat back portion 375 (e.g., the left and right sides) to support the sides of the back of the occupants. Each of the back bolsters 380, 390 may have a bottom end 384, 394 and a top end 386, 396 relative to the general orientation of the seat assembly 200.

The haptic alert device 120 is shown to be integrated with the illustrated seat assembly 200 (FIG. 2). For example, the haptic alert device 120 includes an array of actuators 500, which includes a first actuator 322 installed in the first lower bolster 320 and a second actuator 332 installed in the second lower bolster 330. The haptic alert device 120 may further include a third actuator 382 installed in the first back bolster 380 and a fourth actuator 392 installed in the second back bolster 390. It should be noted that in other embodiments, the array 500 may include any number of additional actuators on either side of the seat back member 220, as well as other locations.

Figure 5:
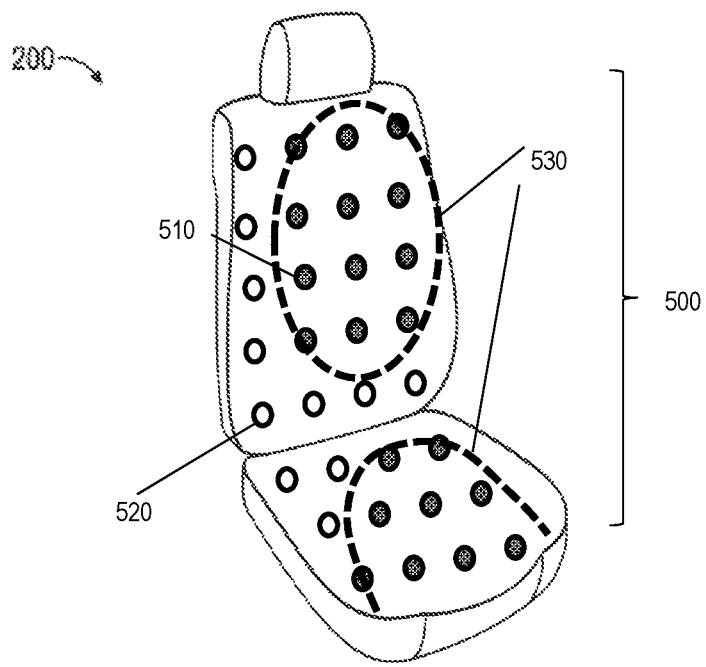
FIG. 5 depicts an example seat assembly with multiple haptic actuators that are part of the haptic alert system, which are configured and calibrated based on a user footprint.

FIG. 5 depicts an example seat assembly with multiple haptic actuators in the array 500 that is part of the haptic alert system. The actuators in the array 500 are configured and calibrated based on a user footprint as described herein. The seat assembly 200 includes the haptic alert device 120, which includes an array of actuators 500 among which, a first set of actuators 510 are active and a second set of actuators 520 are inactive. The user customization unit 124 determines which actuators to activate and which ones to deactivate based on a user footprint 530. In one or more examples, the user identification unit 126 determines the user footprint 530 and the actuators to be activated/deactivated are determined based on a boundary of the footprint 530. The actuators 510 that fall within the boundary of the footprint are activated and the actuators 520 that are outside the boundary are deactivated.

The technical solutions described herein accordingly facilitate automatically adjusting arrays of haptic actuators in a seat assembly based on a user's physical profile and personal preference by dynamically reconfiguring a subset of actuators as well as determining the appropriate driving intensity of the activated actuators. It is understood that the number of actuators shown in FIG. 5, or any other drawings herein are exemplary and that in one or more embodiments, the number of actuators can be different than those illustrated herein. For explanation purposes, the description herein shall use the haptic alert device 120 with the array 500 including the actuators 322, 332, 382, and 392.

Referring to FIG. 3, the actuators 322, 332, 382, 392 are provided to independently generate the desired haptic signals to the occupant either on the left bottom side, right bottom side, left back side, right back side, and/or any combination thereof. However, in other embodiments, additional actuators may be provided in the array 500 (FIG. 5), either in the seat bottom, seat back, other parts of the seat, or in other parts of the vehicle. In one exemplary embodiment, installation of the actuators 322, 332, 382, 392 in the respective bolsters 320, 330, 380, 390 functions to isolate the actuators vibration from one another such that the actuators 322, 332, 382, 392 tactile vibration is decoupled (or isolated) from one another. As such, the vibrations may be highly localized. Consequently, when it is desired to generate only a subset of all the haptic actuators (e.g., one or two left-side actuators), the seat occupant does not experience unintended vibrations that can travel through the seat cushion material or seat structure to the other actuator location (e.g., the right-side actuator(s)). As one example, the peak amplitude of measured vertical acceleration at the activated actuator location normal to the seat bolster surface may be at least seven times greater than the peak amplitude of the measured acceleration along the axis parallel to the axis of rotation of the motor actuation.

In one or more examples, the first and second actuators 322, 332 are positioned about two-thirds of the distance between the front ends 324, 334 of the bolsters 320, 330 and the seat back member 220. In one exemplary embodiment, the first and second actuators 322, 332 (e.g., the forward edge of the actuators 322, 332) may be laterally aligned with the H-point (or hip-point) 370, as schematically shown. In other embodiments, the actuators 322, 332 (e.g., the rear edge of the actuators 322, 332) are positioned approximately 25 cm forward of the H-point 370 and/or between 0 cm and 25 cm forward of the H-point 370. As generally recognized in vehicle design, the H-point 370 is the theoretical, relative location of an occupant's hip, specifically the pivot point between the torso and upper leg portions of the body. In general and as discussed above, the actuators 322, 332 are positioned with consideration for performance, durability, and comfort. The exemplary positions discussed herein enable advantageous occupant responses from the perspectives of both faster and more accurate detection and interpretation (e.g., feeling the vibration and recognizing the alert direction), typically on the order of hundreds of milliseconds.

Determining the user footprint 530 can be part of the user identification when the user sits on the seat assembly 200, or when the vehicle 10 is started, or in response to any other such event that initiates the user identification. Activating and deactivating the actuators is referred to herein as "configuring" the actuators in the haptic alert device 120. Further, the user customization unit 124 also "calibrates" the actuators, which includes adjusting an intensity of the actuators, which in turn adjusts an amount of vibration, or haptic feedback provided by each of the actuators to the driver. Determining the calibration of the actuators can be limited to only the activated actuators 510, in one or more examples. Further, calibrating the actuators, in one or more examples, is specific to the identified user. For example, the intensity of an actuator will depend on user settings and demographics (e.g., low for heavy individuals.). The user customization unit 124 thus improves occupants comfort when activating the haptic alert device 120.

Accordingly, the configuration and calibration of the actuators in the seat assembly 200 can be varied according to the user footprint 530. Such customization of the haptic alert device 120 improves user experience and safety in cases such as the vehicle 10 being used in car sharing services (e.g., MAVEN™)

Alternatively, or in addition, the configuration and calibration of the actuators is varied based on the alert that is being provided to the user. For example, additional contextual information is provided to the driver based on particular haptic feedback being provided by the actuators in the seat assembly 200 being driven, e.g. direction (left, right, etc.). For example, the actuators 322, 332, 382, 392 may individually generate various portions of a haptic alert, respectively, or be individually operated to generate the entire response. As an example, the two back actuators 382, 392 provide a clear signal regarding the nature of the alert and direction the alert is referring to, e.g., rapid pulsing of the left back actuator 382 signals to the driver that a vehicle is approaching in the left adjacent lane and/or that a vehicle is within the left-side side blind spot. Such a directional/spatial awareness alert using a subset of the actuators (instead of using all the actuators, such as by also activating the right actuator) in this case of an alert associated with the left lane, may reduce the chance that the occupant will incorrectly associate the activation with a right side event, which in turn may increase the time it takes for the occupant to determine a left side event has occurred. Similarly, the position and size of the actuators 322, 332. 382, 392 provide advantages with respect to seat durability, which can be measured by commonly used sliding entry, jounce and squirm, and knee load durability seat validation tests. The actuators 322, 332. 382, 392 may be designed to function for 100,000 actuation sequences over 150,000 miles of vehicle life. Other actuator positions may compromise occupant detection and alert effectiveness, seat comfort, and seat durability. For example, if the haptic device is placed at the very front edge of the seat bottom, the occupant may not perceive seat vibrations if they pull their legs back against the front portions of the seat.

The customization of the array of actuators in the haptic alert device 120 facilitates adapting the haptic actuator intensity level to maximize driver comfort. Further yet, by detecting the user footprint 530 and customizing the actuators in the haptic alert device 120 accordingly, the vehicle 10 can ensure contact between the haptic alert device 120 and the driver.

Figure 6:
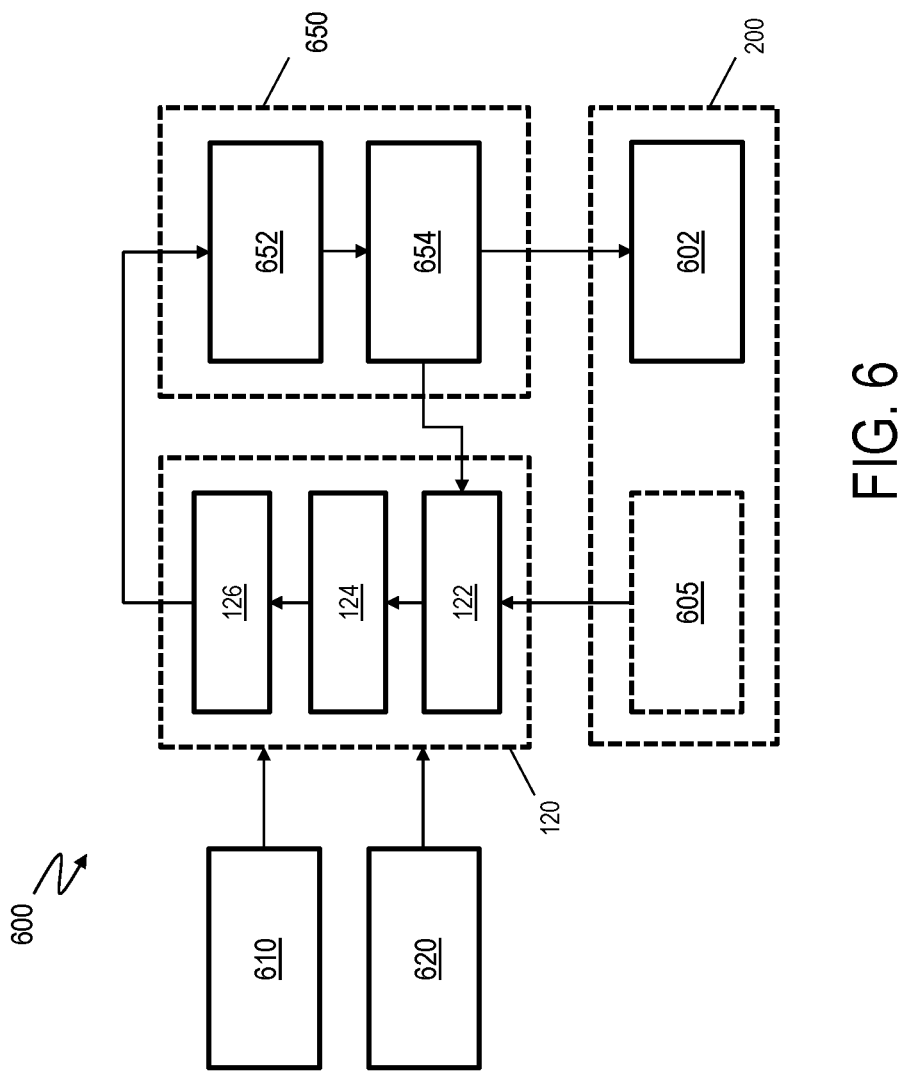
FIG. 6 depicts a block diagram of a haptic alert device customization system according to one or more embodiments.

FIG. 6 depicts a block diagram of a haptic alert device customization system according to one or more embodiments. The haptic alert device customization system 600 includes, among other components, the array of actuators 500 in the seat assembly 200. The system 600 also includes one or more pressure sensors 605 that are part of the seat assembly 200 that facilitate measuring pressure applied by a driver seated on the seat assembly 200. In one or more examples, the pressure sensors are massagers embedded in the seat assembly 200.

The system 600 further includes a haptic controller 650. In one exemplary embodiment, the haptic controller 650 corresponds to the control module 130 discussed above, although the haptic controller 650 may alternatively be a separate controller. The haptic controller 650 commands the actuators in the array 500 based on the user footprint 530 and the alert to be provided to create the haptic feedback felt by the driver of the vehicle 10. The haptic feedback created by the haptic pulses indicates the type of alert, e.g., the nature of the collision condition. The haptic controller 650 determines the appropriate voltage and determines, for example, a pulse width modulation (PWM) pattern of "on" periods where voltage is provided to the actuators and "off" periods where no voltage is provided to the actuators.

In one or more examples, the haptic controller 650 includes an ammeter 652. Alternatively, or in addition, the ammeter 652 may be an external circuit coupled with the controller 650. The ammeter 652 measures the average current from each actuator in the array. The haptic controller 650 further includes a processing unit 654 that performs one or more computations, for example, based on one or more computer executable instructions.

The system 600 can further include a human-machine interface (HMI) device 610 that facilitates the driver to enter one or more preferences for the user settings. For example, the HMI device 610 can include one or more buttons, a touchscreen, sensors, and the like that the user can use to enter the user settings. The HMI device 610 can be the driver-vehicle interface of the vehicle 10.

The system 600 further includes one or more cameras 620 that is/are used to capture one or more images of the user to determine the user footprint 530.

Figure 7:
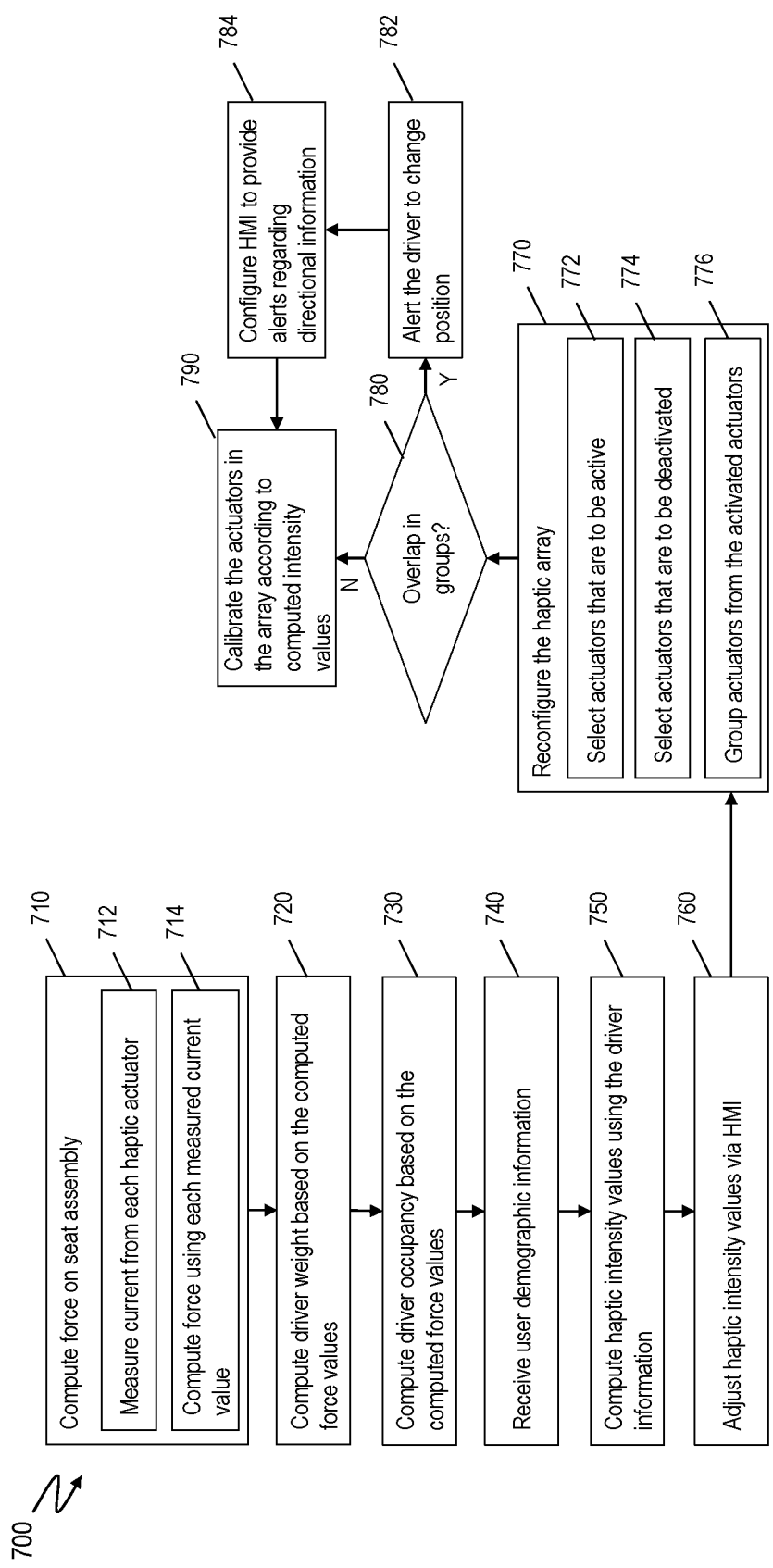
FIG. 7 depicts a flowchart for customizing a haptic alert device according to one or more embodiments.

FIG. 7 depicts a flowchart for customizing a haptic alert device according to one or more embodiments. The method 700 includes estimating a force on the seat assembly 200 using the N haptic actuators in the array 500, at 710. Estimating the force includes measuring an electric current $i_n$ from each haptic actuator in the array 500, at 712. Further, the method includes computing the force $p_n = f(i_n)$, for each haptic actuator in the array 500, at 714. The function $f(i)$, in one or more examples, is a parametric function (e.g. polynomial), which is a predetermined function. Alternatively, in one or more examples, the force is determined using a look-up table (LUT) that is calibrated to convert the measured current to a corresponding weight value. The current values are measured using the ammeter 652.

Further, the method 700 further includes computing an estimated weight of the driver seated on the seat assembly 200, at 720. In one or more examples, the estimation is performed by computing:

$$G = \Sigma w_n p_n + c \qquad \text{Eq. (1)}$$

Here, G is the estimated driver weight, $w_n$ are predetermined weight factors associated with each of the N haptic actuators in the array 500, and c accounts for additional weight of the driver that is not on the seat assembly 200 (e.g. legs). In one or more examples, the weight factors $w_n$ are parameters that are based on regression and training data that includes empirical force values $p_n$. Accordingly, the weight estimate is a weighted sum of all the force estimates from the haptic array 500 on the seat assembly 200.

Alternatively, in one or more examples, the weight estimate G is computed directly using the current measurements. In this case the estimation can be performed by computing:

$$G = \Sigma w_n i_n + c \qquad \text{Eq. (2)}$$

Here, the weight factors $w_n$ are parameters that are based on regression and training data that includes empirical current values $i_n$.

Further, the method 700 includes determining occupancy of the driver on the seat assembly 200, at 730. The occupancy is determined by comparing the force values for each haptic actuator in the array with corresponding threshold values $T_n$. In one or more examples, each haptic actuator from the array 500 has a different threshold value respectively, for example, the threshold value may be smaller for seat back compared to seat front. Accordingly, a haptic actuator is considered to be part of the first set of actuators 510 that is to be activated (or maintained activated) if $p_n > T_n$; and is considered to be part of the second set of actuators 520 that is to be deactivated (or maintained deactivated) if $p_n \le T_n$. Accordingly, the footprint 530 of the driver is determined by occupancy and positions of each haptic actuator in the array 500.

It should be noted that in one or more examples, the seat assembly 200 may contain strain gauges or other sensors to detect the presence of users on the seat assembly 200. In such cases such strain gauges are used to detect occupancy of the driver. In one or more examples, such strain gauges may be limited to binary detection (occupied/unoccupied) and may be unsuitable for weight estimation.

The method 700 further includes receiving user demographic information, at 740. The demographic information can include gender, age, height, and the like. In one or more examples, the driver may provide the demographic information, for example, via the HMI 620. Alternatively, or in addition, the demographic information may be obtained automatically via the camera 610. Alternatively, or in addition, the demographic information may be accessed from a storage device that stores the demographic information associated with a user identifier. The camera 620, and/or the HMI 610 is used to receive the user identifier, such as a username/password, a biometric, an RFID signal (or any other short-range communication signal), and the user demographic information is accessed. In one or more examples, the height of the driver is estimated automatically from seat settings, for example, using a regression model.

Further, the method 700 includes computing a haptic activation intensity I for the haptic actuators in the array 500, at 750. In one or more examples, the intensity is determined using I=g(S, W, A, H), where g is a regression function, S is sex, W is the weight, A is age, and H is height of the driver. Alternatively, the intensity is determined using a look-up table that maps the parameters S, W, A, and H, to an intensity value. In one or more examples, the computed intensity I is used across all the haptic actuators in the array 500. Alternatively, the intensity I is scaled differently for each actuator in the array 500, so that the intensities may be same for all actuators or different for each.

In one or more examples, a missing parameter m (e.g. sex, age) with a distribution $f(m)$ is marginalized out when computing the intensity value. For example, the missing parameter m is marginalized by computing the intensity using:

$$I' = \int g(S,W,A) f(m) dm \qquad \text{Eq. (3)}$$

The distribution is a known distribution for the missing parameter m using empirical data over a target market in which the vehicle 10 is being used. Further yet, in one or more examples, the driver can adjust the computed intensity values, for example, via the HMI 610, at 760. The driver accordingly can override one or more of the intensity values that are automatically computed.

The method 700 further includes reconfiguring the haptic array 500, at 770. The reconfiguring includes selecting the first set of haptic actuators 510 to be activated, at 772 and the second set of haptic actuators 520 to be deactivated, at 774. The reconfiguration further includes grouping certain actuators in the array 500 to convey, for example, directional information as described herein. The grouping is performed on the first set of activated actuators 510, at 776. The grouping creates a mapping between specific haptic actuators and direction in the occupant footprint 530 that contains the currently active haptic actuators. For example, the activated actuators can be grouped such as "front→lowermost active layer on seat bottom", "left-front→leftmost active layer on seat bottom", and "rear→uppermost active layer on seat back". It is understood that different, additional, or fewer groups can be formed in different examples, than those listed above.

The method 700 further includes determining if there is an overlap among the groups that prevents providing directional information, at 780. For example, the overlap may cause an insufficient number of active actuators in one group, for example if the leftmost and rightmost groups intersect. The overlap is determined if the number of common actuators in two groups is above a predetermined threshold.

If the overlap is detected, the method 700 includes providing an alert to the driver to change seating position on the seat assembly 200, at 782. In one or more examples, the alert is provided via the haptic array 500, such as by generating a haptic feedback via all the haptic actuators in the array 500. In one or more examples, the alert may use a particular pattern of haptic feedback provided by the actuators in the array 500. Further, in one or more examples, in case the overlap is detected, the method 700 includes configuring the HMI 640 to provide the alerts regarding directional information, instead of using the haptic array 500, at 784. For example, the HMI 610 can be configured to display an image representative of the vehicle 10 with an alert indicating the directional aspect of the alert, such as an image/animation on a specific side of the image representative of the vehicle 10.

The method 700 further includes calibrating the actuators in the array 500 according to computed intensity values, at 790. In one or more examples, the actuators are calibrated regardless of whether an overlap is detected or not. Alternatively, in one or more examples, the actuators are calibrated only if the overlap is not detected. In one or more examples, upon providing the alert to the driver to change his/her position, the system 600 repeats the method to determine the user footprint 530 and the actuators are calibrated once there is no overlap detected.

The method 700 is repeated periodically, for example after a predetermined time interval. Alternatively, or in addition, the method 700 is initiated when the seat position is changed. Alternatively, or in addition, the method 700 is repeated when the vehicle 10 is ignited. Alternatively, or in addition, the method 700 is initiated on demand, in response to a request via the HMI 610.

The one or more embodiments accordingly facilitate ensuring proper contact between the haptic array and the driver. Further, the one or more embodiments facilitate adapting haptic actuator intensity levels to maximize driver comfort. Accordingly, the technical solutions described herein improve the haptic alert device 120 and provide improved safety of the vehicle 10 in addition to an improved user experience. The technical solutions facilitate such improvements by automatically determining driver information using haptics, cameras, etc. The technical solutions described herein further dynamically reconfigure the haptic actuators as the driver moves on the seat. Further, the technical solutions calibrate the haptic actuators to haptic intensity settings that are automatically determined. The technical solutions described herein, accordingly, automatically adjust arrays of haptic actuators in seats based on user's physical profile and personal preference, facilitating a subset of actuators to be dynamically reconfigured as well as determining the appropriate driving intensity. The user may be a driver of the vehicle 10. Alternatively, or in addition, the user may be a passenger of the vehicle 10, for example in case the vehicle 10 is an autonomous vehicle. Accordingly, in one or more examples, the technical solutions described herein use and/or determine an occupant profile that is used to provide automatic reconfiguration and calibration of the haptic alert device 120. The occupant profile may be driver profile or a passenger profile.

In one or more examples, the haptic alert device 120, which may be integrated with the seat assembly 200, is used to provide augmented reality features to improve the driver's spatial awareness, to further reduce safety risks and improve user experience. For example, an augmented reality system that uses the haptic alert device 120, along with other components such as the HMI 610, can reduce accidents caused by distractions, absent mindedness, and/or reckless drivers of remote vehicles. Further, the augmented reality system can facilitate improved trust, confidence, and re-engagement of the driver during transition of the vehicle 10 from an autonomous operation mode to a manual operation mode.

Figure 8:
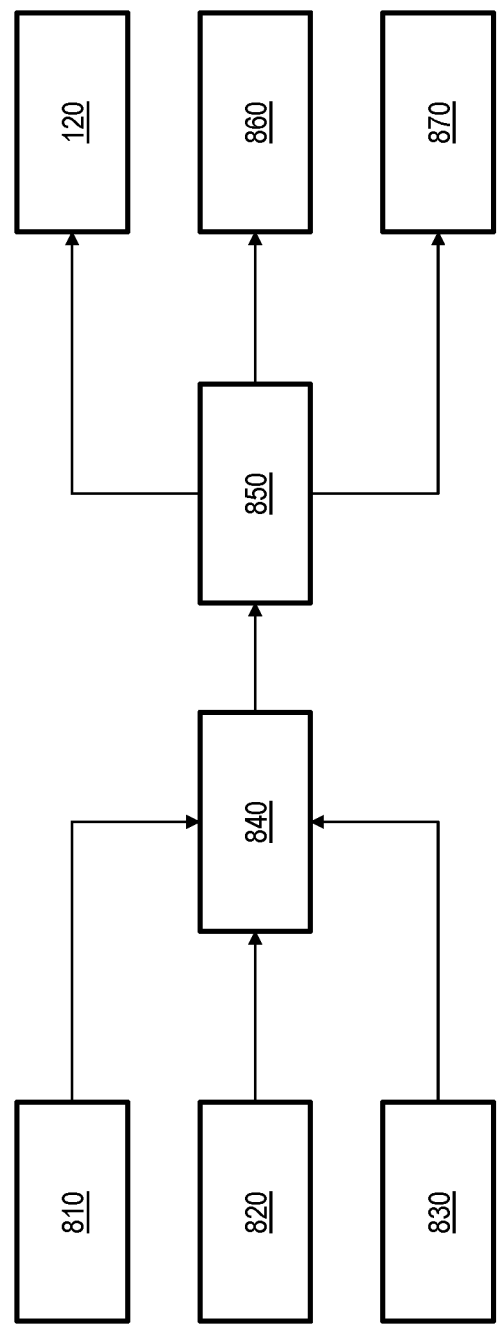
FIG. 8 depicts a block diagram for an augmented reality system for a vehicle according to one or more embodiments.

FIG. 8 depicts a block diagram for an augmented reality system for a vehicle according to one or more embodiments. The illustrated augmented reality system 800 includes a sensor fusion module 810, a driver monitoring system (DMS) 820, a remote driver monitoring system (RDMS) 830, a prioritization module 840, a mapping module 850, the haptic alert device 120, a display system 860, and an acoustic system 870, among other components. In one or more examples, the sensor fusion module 810 may be part of the collision avoidance module 110 described herein. It is understood that the sensor fusion module 810 and the collision avoidance module 110 may be used interchangeably.

The sensor fusion module 810 produces object tracks based on one or more on-board sensors of the vehicle 10, such as LIDAR, camera, radar, V2V, etc. that monitor objects within a predetermined surrounding/vicinity of the vehicle 10. Sensor fusion combines the sensory data or data derived from the disparate sources such that the resulting information has less uncertainty than would be possible when these sources are used individually. In one or more examples, the sensor fusion is performed on the sensory data from sensors with overlapping field of view. The result of the sensor fusion module 810 provides information about one or more objects that are in the predetermined vicinity of the vehicle 10. For example, the object information includes a distance from the vehicle 10 and a directional information indicative of a direction in which the object is in relation to the vehicle 10.

The DMS 820 computes and provides a driver attentiveness rating (or score, or level) of the driver of vehicle 10. In one or more examples, the driver attentiveness is computed using known techniques and based on one or more sensors on board the vehicle 10 that are used to monitor the driver. For example, the one or more sensors that track the eye gaze of the driver, and direction in which the driver is looking. Other types of sensors and measurements can be used to measure the driver attentiveness by the DMS 820.

The RDMS 830 monitors one or more remote vehicles (vehicles other than the vehicle 10) and/or remote objects and provides a recklessness score of a remote vehicle based on driving characteristics of the remote vehicle. In one or more examples, the sensor fusion module 810 provides data to the RDMS 830, which uses the input data to determine the reckless score of the remote vehicle(s). The RDMS 830 can also determine a traveling speed of the object, and a predicted collision time when the object may collide with the object. Further, the object information can include a track of the object, which is a set of previous positions of the object, and a predicted track of the object.

The prioritization module 840 receives the outputs from the sensor fusion module 810, the DMS 820, and the RDMS 830 to generate an alert for the driver. The alert can include highlighting one or more objects that are being tracked by the one or more on-board sensors and/or systems. For example, the prioritization module 840 determines a priority score for each object being tracked using metrics such as Time of Intercept (TOI), distance, and velocity associated with each of the object, received from the sensor fusion module 810. For example, the priority scores of the remote objects are inversely proportional to the TOI and/or distance from the vehicle 10, accordingly, giving higher priority to a remote object that is closer to the vehicle 10 or that may reach the vehicle (or vice versa) 10 earlier. In one or more examples, the TOI can be the predicted collision time described earlier herein.

Further, the prioritization module 840 can incorporate scaled metrics based on the output from the DMS 820. A higher scaling factor is used for objects in the direction in which the driver is not looking, e.g. higher scaling factor to an object in front of the vehicle 10 when the driver looks away. In one or more examples, the prioritization module 840 further selects the top Q objects from those being tracked based on the computed priority score. The prioritization module 840 accordingly determines which remote objects to present to the driver to prevent information overload. The prioritization is based on remote object metrics such as distance, time to intercept and speed, which can be further combined to a single score using weight factors for each metric. The weight factors can incorporate contextual information—such as driver attentiveness, driving environment (e.g. urban vs rural, highway, etc.), remote vehicle recklessness score.

The mapping module 850 maps the selected Q objects to the one or more output devices of the augmented reality system 800, namely the haptic alert device 120, the display device 860, and the acoustic system 870 to provide an alert associated with an object with the mapped output device(s). For example, the mapping module 850 can map the TOI of an object to a haptic pulse rate or intensity of the haptic alert device 120; that is, the intensity of the actuators in the array 500 is calibrated and changed according to the TOI. For example, the intensity increases as the TOI decreases. In addition, the mapping module 850 maps the TOI to the visual representation of an object in the display device 860. For example, the object with a TOI within a particular predetermined range is displayed using a color associated with that range, or may blink with a rate that intensity increases as the TOI decreases or be displayed with a different iconography based on its distance from the vehicle 10. Additionally, the mapping module 850 maps the TOI to an audible alert generated by the acoustic system 870. For example, if the TOI falls below a predetermined threshold, the audible alert is generated via the acoustic system 870 or the pitch or intensity of the alert is varied inversely with the TOI.

The display device 860 can be a heads-up display (HUD), a touchscreen, or any other display system that provides visual feedback to the driver. In one or more examples, the display device 860 provides a 3D or a 2D projection of the objects that are being tracked by the one or more on-board sensors. The display device 860 may provide additional visual feedback such as information about one or more components of the vehicle 10. The acoustic system 870 is a system that provides audio feedback to the driver. In one or more examples, the acoustic system 870 can include one or more speakers of the vehicle 10 or any other audio feedback device.

Figure 9:
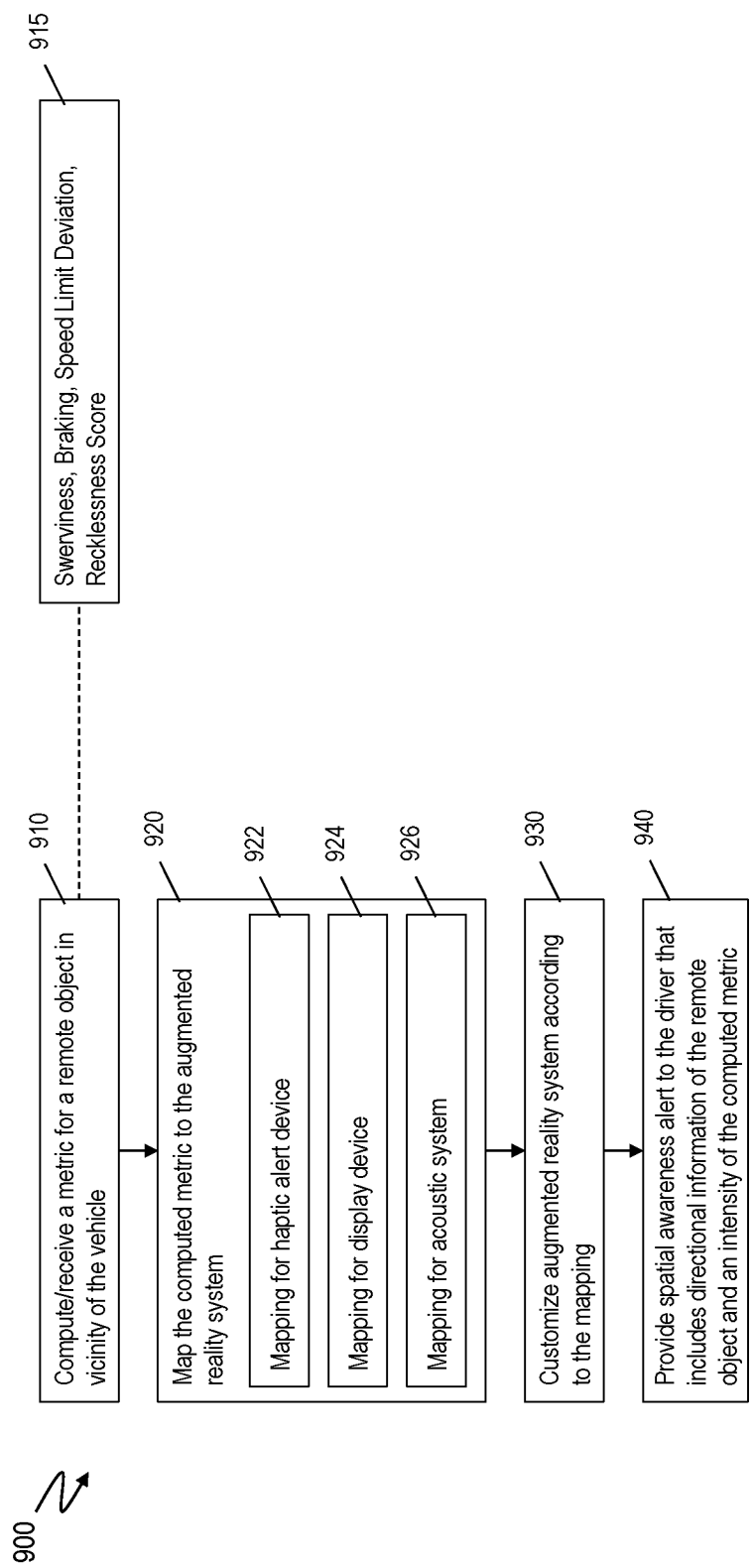
FIG. 9 depicts a flowchart for providing spatial awareness alerts to a driver via an augmented reality system according to one or more embodiments.

FIG. 9 depicts a flowchart for providing spatial awareness alerts to a driver via an augmented reality system according to one or more embodiments. The method 900 depicted includes computing/receiving a metric for a remote object in vicinity of the vehicle 10, at 910. The metric is determined based on the sensor fusion data by the RDMS 830. In one or more examples, the metric is a distance of the object from the vehicle 10. Alternatively, the metric is a TOI of the object with the vehicle 10. The object can be any object in a predetermined vicinity of the vehicle 10. For example, the object can be a stationary object, a pedestrian, another vehicle, and the like.

In one or more examples, the metric is a recklessness score of a remote vehicle, at 915. In one or more examples, the recklessness score is accessed from a remote server using one or more identifiers of the remote vehicle detected by the one or more sensors. For example, the recklessness score is determined using a license plate number, a vehicle identification number, and the like that the sensors capture of the remote vehicle.

Alternatively, or in addition, the recklessness score is based on monitoring one or more driving characteristics of the remote vehicle. For example, the on board sensors of the vehicle 10 monitor one or more driving characteristics of the remote vehicle and compute a recklessness score of the remote vehicle using the driving characteristics. In one or more examples, the RDMS 830 uses sensor fusion and/or V2X/wireless data to monitor driving characteristics such as speed, swerving, and lane violations of the remote vehicle. For example, the sensor fusion data provides a movement track of the remote vehicle. The RDMS 830 performs a Fourier analysis, Kalman filtering, or other analysis or a combination thereof using the movement track data of the remote vehicle to determine the one or more driving characteristics.

For example, the RDMS 830 computes the lateral variability of the remote vehicle by determining a deviation amplitude and a deviation frequency of the remote vehicle using its movement track. The movement track is a collection of position data of the remote vehicle over a predetermined amount of time. The deviation amplitude is indicative of an amount of deviation of the remote vehicle from a center of a lane in which the remote vehicle is traveling. The deviation frequency is indicative of a frequency at which the remote vehicle deviates from the center of the lane in which the remote vehicle is traveling. The lateral variability is a combination of the deviation amplitude and the deviation frequency.

Further, the RDMS 830 determines abrupt braking of the remote vehicle from the movement track data. For example, the RDMS 830 determines a maximum deceleration of the remote vehicle in a predetermined time window from the movement track data. Further, the RDMS 830 determines a deviation from a speed limit by the remote vehicle. The RDMS 830 computes the recklessness score of the remote vehicle using one or more of these driving characteristics. For example, the RDMS 830 uses exponentially moving average to reduce each of the driving characteristics to a single value and computes the recklessness score as a predetermined function of the reduced values. Alternatively, the recklessness score can be determined using a lookup table with the reduced values.

It should be noted that the recklessness score may be determined using other driving characteristics in other examples. Further, it should be noted that while an example of the recklessness score is described herein, in other examples other metrics of the remote vehicle (and other objects) are computed.

The method 900 further includes mapping the computed metric to the augmented reality system 800, at 920. As described herein, the mapping includes determining one or more customization parameters for the one or more output devices of the augmented reality system 800. For example, the mapping module 850 determines an intensity/pulse rate of the haptic alert device 120, a color for the object in the display device 860, and an audible alert for the object in the acoustic system 870 based on the computed metric, at 922, 924, and 926. In one or more examples, the mapping includes determining the parameters for the output devices using corresponding look up tables. Alternatively, or in addition, the parameters are determined using a predetermined formula that uses the computed metric as an input value. It should be noted that the mapping is performed if the prioritization module 840 indicates that the object is one of the Q objects that the driver is to be alerted about based on the computed metric.

The method further includes customizing the augmented reality system 800 according to the mapping for the computed metric, at 930. The customization is performed to provide the driver a spatial awareness of the object. For example, the customization includes configuring and calibrating the one or more actuators in the haptic alert device 120 as described herein.

Further, the calibration can include adjusting the output of the display device 860 by changing the color/size, or any other attribute or a combination thereof of a representation of the object, for example to indicate an intensity/urgency of the computed metric. The display can also be customized to provide a directional information of the object. Further yet, the calibration can include adjusting the audio output of the acoustic system 870 to indicate the metric including the intensity/urgency and the directional information. For example, the audio output provides a directional audio, such as by using one or more speakers on a specific side of the driver to indicate a direction of the object and a specific pattern/tone/audible/volume to indicate the urgency of the metric.

The method 900 further includes providing the spatial awareness alert to the driver that includes directional information of the remote object and an intensity of the computed metric via the augmented reality system 800, at 940. Providing the alert includes causing one or more of the haptic alert device 120, the display device, 860, and the acoustic system 870, to generate an output using the customizations.

The technical solutions described herein facilitate increasing driver spatial awareness using augmented reality. The technical solutions described herein provide improvements to augmented reality systems by providing spatial awareness via one or more output devices including haptic alert devices, visual output devices, and acoustic devices. In one or more examples, the alert provides location of nearby objects, such as people, vehicles, mapped to intensity of different haptic actuators in an array. The technical solutions further facilitate a remote driver monitoring system to assign a score to remote objects based on features derived from sensor fusion tracks and map information, which can be utilized by a prioritization system to customize the augmented reality system according to assigned scores. Further, the technical solutions described herein facilitate remote object mapping to haptic array, display, and/or acoustics to communicate to driver positions and importance of one or more remote objects.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for adjusting a notification system of a vehicle, the method comprising:

receiving, by a controller, an occupant profile of an occupant of the vehicle;

determining, by the identification unit, an identification of the occupant and an associated occupant footprint from the occupant profile or estimating the occupant footprint for the occupant when the occupant cannot be identified;

adjusting, by the controller, a haptic array according to the occupant profile, the haptic array comprising a plurality of haptic actuators, the adjusting comprising activating a first subset of the haptic actuators and deactivating a second subset of the haptic actuators based a boundary associated with the occupant footprint; and providing, by the haptic array, a notification to the occupant of the vehicle by providing a haptic feedback using the activated haptic actuators.

2. The method of claim 1, wherein the occupant profile comprises a weight of the occupant.

3. The method of claim 1, wherein adjusting the haptic array further comprises:

calibrating, by the controller, an intensity of the haptic feedback provided by one of the activated haptic actuators according to the occupant profile.

4. The method of claim 1, wherein adjusting the haptic array further comprises:

grouping, by the controller, the haptic actuators into directional subgroups to provide the occupant with spatial awareness for the notification.

5. The method of claim 1, further comprising, automatically generating the occupant profile using one or more sensors, the generating comprising:

determining a weight of the occupant; and determining an occupant footprint of the occupant.

6. The method of claim 1, further comprising:

determining, by the controller, if one of the activated haptic actuators is not in contact with the occupant; and in response, providing an alert to the occupant to change seating position.

7. The method of claim 1, wherein the haptic actuators are embedded in a seat assembly.

8. The method of claim 4, wherein the spatial awareness includes directional information associated with an object.

9. A system for providing a notification to an occupant of a vehicle, the system comprising:

an identification unit, the identification unit configured to identify an occupant;

a haptic alert device comprising an array of haptic actuators; and a controller coupled with the haptic alert device, the controller configured to customize the array of haptic actuators, the customization comprising:

receiving, by a controller, an occupant profile;

determining, by the identification unit, an identification of the occupant and an associated occupant footprint from the occupant profile or estimating the occupant footprint for the occupant when the occupant cannot be identified;

adjusting, by the controller, a haptic array according to the occupant profile, the haptic array comprising a plurality of haptic actuators, the adjusting comprising activating a first subset of the haptic actuators and deactivating a second subset of the haptic actuators based a boundary associated with the occupant footprint; and providing, by the haptic array, a notification to the occupant of the vehicle by providing a haptic feedback using the activated haptic actuators.

10. The system of claim 9, further comprising:
a seat assembly, the haptic alert device being embedded into the seat assembly.

11. The system of claim 10, wherein the occupant profile comprises a weight and an occupancy of the occupant on the seat assembly.

12. The system of claim 9, adjusting the haptic array further comprises:
calibrating, by the controller, an intensity of the haptic feedback provided by one of the activated haptic actuators according to the occupant profile.

13. The system of claim 9, wherein adjusting the haptic array further comprises:
grouping, by the controller, the haptic actuators into directional subgroups to provide the occupant with spatial awareness for the notification.

14. The system of claim 9, wherein adjusting the haptic array further comprises, automatically generating the occupant profile using the haptic array, the generating comprising:
determining a weight of the occupant; and
determining an occupant footprint of the occupant.

15. The system of claim 9, wherein the haptic array is part of a seat assembly, and the controller is further configured to:
determine that one of the activated haptic actuators is not in contact with the occupant; and
in response, provide an alert to the occupant to change position on the seat assembly.

16. A seat assembly comprising:
an identification unit, the identification unit configured to identify an occupant;
a haptic array comprising a plurality of haptic actuators; and
a controller coupled with the haptic array, the controller configured to customize the haptic array, the customization comprising:
receiving, by the controller, a user profile;
determining, by the identification unit, an identification of the occupant and an associated occupant footprint from the occupant profile or estimating the occupant footprint for the occupant when the occupant cannot be identified;
adjusting, by the controller, the haptic array according to the user profile, the adjusting comprising activating a first subset of haptic actuators and deactivating a second subset of haptic actuators based a boundary associated with the occupant footprint; and
providing, by the haptic array, a notification to a user of the seat assembly by providing a haptic feedback using the first subset of haptic actuators.

17. The seat assembly of claim 16, wherein adjusting the haptic array further comprises, automatically generating the user profile using the haptic array, the generating comprising:
determining a weight of the user; and
determining an occupant footprint of the user.

18. The seat assembly of claim 16, wherein adjusting the haptic array further comprises:
calibrating, by the controller, an intensity of the haptic feedback provided by one of the haptic actuators from the first subset according to the user profile.

19. The seat assembly of claim 16, wherein adjusting the haptic array further comprises:
grouping, by the controller, the haptic actuators into directional subgroups to provide the user with spatial awareness for the notification.

20. The seat assembly of claim 16, wherein the controller is further configured to:
determine that one of the haptic actuators from the first subset is not in contact with the user; and
in response, provide an alert to the user to change position on the seat assembly.

* * * * *